Jan. 28, 1969 A. ANDROSHUK ET AL 3,424,661
METHOD OF CONDUCTING CHEMICAL REACTIONS IN A GLOW DISCHARGE
Filed April 28, 1967
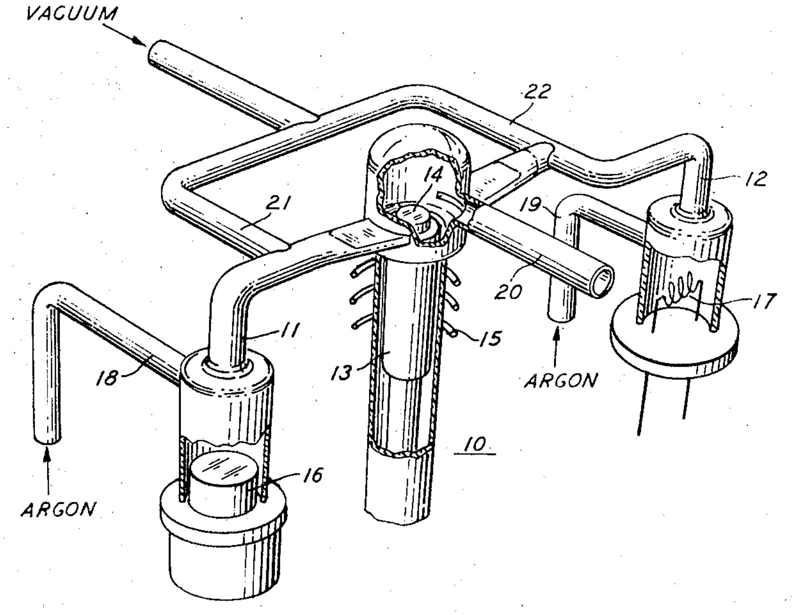
INVENTORS A. ANDRUSHUK
W. C. ERDMAN
BY A. A. BERGH
ATTORNEY 3,424,661
Patented Jan. 28, 1969

3,424,661

METHOD OF CONDUCTING CHEMICAL REACTIONS IN A GLOW DISCHARGE

Alex Androshuk, Bethlehem, Pa., Arpad A. Bergh, Murray Hill, N.J., and William C. Erdman, Bethlehem, Pa., assignors to Bell Telephone Laboratories, Incorporated, Berkeley Heights, N.J., a corporation of New York Continuation-in-part of application Ser. No. 576,654, Sept. 1, 1966. This application Apr. 28, 1967, Ser. No. 641,094
U.S. Cl. 204—164 7 Claims
Int. Cl. B01k *1/00*

ABSTRACT OF THE DISCLOSURE

The disclosure is directed to chemical reactions between gas phase reactants promoted by a DC discharge plasma. Of special interest are reactants such as silicon tetrachloride and nitrogen for depositing thin films of silicon nitride. Plasmas containing such highly corrosive reactants are contained by a special method and apparatus which involve the continuous isolation of the electrodes from the corrosive species in the plasma by a relatively inert, flowing, gas envelope.

This is a continuation-in-part of our abandoned copending application, Ser. No. 576,654, filed Sept. 1, 1966, and relates to a method for depositing insulating or protective films.

The deposition of a protective or insulating film on a substrate surface has various commercial uses particularly in the processing of electrical semiconductor devices such as diodes and transistors. In the fabrication of these devices oxide films are used for masking portions of the semiconductor to obtain selective diffusion and are also employed as passivating layers for protecting the surface of the device against contamination and leakage currents. Recently, nitride films have been proposed for these purposes.

The conventional method for producing an oxide layer on a semiconductor body is by growing the oxide as a result of thermally induced oxidation of the semiconductor surface. This practice has been recognized as inconvenient in the processing of electrical devices, especially in forming passivating layers, because the electrical characteristics of the otherwise completed device suffer harmful effects due to the extreme temperatures required to oxidize the semiconductor surface. Furthermore, the growth of oxide passivating films requires that a part of the semiconductor body, to the extent of the depth of the passivating layer, be reserved during processing for subsequent conversion to form the oxide. This creates severe problems in fabricating thin film devices where thickness tolerances and diffusion depths are very critical.

The deposition of oxide, nitride and similar films with the aid of a reactive gas plasma has been found to overcome several of the disadvantages of the prior art methods. A particularly useful plasma deposition technique is described and claimed in United States Patent 3,287,243, issued Nov. 22, 1966, to J. R. Ligenza.

The present invention is directed to a method for depositing thin insulating films by an improved reactive plasma technique. It is applicable to the deposition of various insulating compounds such as oxides, nitrides, carbides, borides, etc. Of principal interest are silicon compounds although the invention is equally applicable to other cations such as aluminum and tantalum. In depositing metal oxides or nitrides by a plasma technique prior to this invention, it has not been practical to introduce both the anion and cation species into the plasma in the gas phase. It is conventional to sputter a cathode consisting of the metal in an oxygen or nitrogen plasma. There are several advantages in supplying the cation to the plasma by introducing an appropriate gas into the plasma containing the cation. Among these are the elimination of surface preparation of the cathode and the adaptability of the process to large scale commercial processing. The reliability, reproducibility and quality of the deposited films are especially high using this technique.

According tothe invention the anion species is provided as a molecular gas such as oxygen or nitrogen. It can also be provided as a compound such as carbon dioxide or ammonia. To this gas is added the cation-bearing gas which is an associated compound existing in a gas phase at the operating temperature (more conveniently at or near room temperature).

In promoting a gas reaction of the nature described here with the aid of a plasma it is found that the ion species in the plasma are highly corrosive to the supporting apparatus, especially the electrodes. The process proceeds with a continuously diminishing current flow until the plasma is extinguished and the electrodes are no longer serviceable. This may occur after only a few minutes of operation. Consequently a practical process using gas reactants cannot be carried out by the conventional reactive sputtering methods. This problem is overcome by the method of the invention by maintaining the electrodes in a protective gas environment during deposition.

These and other aspects of the invention will be appreciated from the following detailed description. In the drawing:

The figure is a perspective view of the reaction chamber of an apparatus useful for the invention.

The apparatus shown in the figure consists essentially of a main reaction chamber 10 and two side chambers 11 and 12 for containing the electrodes. The main chamber 10 contains a pedestal 13 upon which the subrtrate 14 is supported. The material from which the pedestal is made is not critical. It is helpful that it be a good heat conductor. Silicon, aluminum, molybdenum, carbon, and brass and copper if cooled, are appropriate materials. It is also convenient from the standpoint of avoiding contamination of the semiconductor substrate that the pedestal and substrate be of the same material. An RF heater 15 is disposed outside the quartz tube inductively coupled with the pedestal for heating the substrate.

The chamber 11 contains the anode 16 which is merely a block of a conductive material such as aluminum. The chamber 12 contains the cathode which may be any appropriate electron emitter. It may be an electrode similar to the anode or a thermionic emitter. Since the cathode in this process does not sputter as in the conventional processes the cathode composition and character are not important. For the purposes of this invention the cathode is described as an electron source capable of supporting a plasma of the density prescribed hereinafter.

The sole function of the two electrodes in the process of this invention is to support the reactive gas plasma. Neither electrode participates in the chemical reaction or directs the flow of free ions. Consequently the two electrodes can advantageously be isolated from the reaction region. This isolation is achieved by creating a protective gas atmosphere around each electrode with the reactive gas plasma confined to the main reaction chamber 10 where deposition is desired. This feature provides some important advantages. Impurities on or in either electrode cannot reach the region of the substrate to contaminate the deposit. More importantly, the electrode themselves are not consumed, corroded or passivated by direct exposure to the reactive gas plasma.

The protective gas for the electrodes is provided, in the apparatus of the figure, by flowing an appropriate gas such as argon, helium or nitrogen through inlet ports 18 and 19 in the electrode chambers 11 and 12 respectively. Any of the other inert gases can be used as well. Gases such as carbon dioxide, air or other gases that are relatively inert to the electrode material are also useful. It will be appreciated that the presence of an inert gas in the cathode chamber enables the use of a thermionic electron emitter which is not possible according to the prior art reactive sputtering or plasma methods.

The gas reactants for the plasma are admitted through the gas inlet port 20. The gas reactants are chosen according to the material desired in the film. For silicon compounds silane or a derivative thereof is used in conjunction with a gas capable of providing the anion of the compound desired.

The gas used for providing the anion of the compound desired will ordinarily be oxygen or nitrogen. Ammonia and simple amines can also be used for depositing a nitride. For the deposition of carbides, methane and other simple hydrocarbons are appropriate for supplying anion species.

The two reactive gases are admitted to the reaction chamber 10 so that they are intimately mixed at the substrate surface. It is most convenient to mix the reactant gases upstream of the entry port 20 but mixing can be achieved in the chamber where separate inlet ports for each gas are used.

The interface between the protective gas enveloping the electrodes and the reactive gas plasma is maintained by balancing the flow rates of the gases against a vacuum pump connected to the common exhaust ports 21 and 22. The boundary of the plasma is easily recognized by visual observation and adjusted by varying the relative flow rates until the interface reaches the desired position. It is convenient to operate with the plasma boundary in the vicinity of the exhaust ports 21 and 22.

The requirements of the plasma for effective operation according to the principles of this invention can be characterized in terms of its saturation current density and a given pressure range. The gas pressures found to be most useful lie in the range 0.1 torr to 10 torr. The saturation current density is a parameter known in the art and described by Johnson and Malter in Physical Review, 80, 58 (1950). The preferred range of this parameter is in the range 0.1 ma./cm.$^2$ to 100 ma./cm.$^2$. If the saturation current density falls below this range the deposition proceeds very slowly. At saturation current densities in excess of this range the substrate overheats.

The deposition surface of the substrate is completely immersed in the plasma. The plasma can be shaped or deflected with modest magnetic fields placed around the reaction chamber, depending on the geometry of the chamber, to confine the plasma to the desired deposition region.

The product of the plasma reaction will spontaneously deposit on the substrate for the following reasons. The plasma consists of positive and negative ions and free electrons. The electrons have a considerably higher mobility than the ions. Consequently, the electrons will flow into any body in contact with the plasma giving the body a "wall potential." Therefore, for the substrate to receive intense ion bombardment it need not be made a "real cathode" with an external D.C. source. When immersed in the plasma it becomes a "virtual cathode" because of the wall potential.

The following example is given to illustrate the invention.

Example I

The apparatus used was the same as that shown in the figure. Clean polished silicon slices were placed on a silicon pedestal and sealed into the reaction chamber 10. The pedestal was rotated with a magnetic drive to promote uniformity of the deposit. The substrate was heated to about 350° C. using the RF heater and argon gas was admitted through inlet ports 18 and 19. As an alternative to argon as the protective gas the use of nitrogen is particularly effective. It is also convenient in this particular process since nitrogen is already provided as one of the reactants. A mixture of silicon tetrabromide and nitrogen was admitted through inlet port 20 to give a total pressure of 0.8 torr. The gas pressure determines, in part, the density of the plasma. Pressures which give a useful plasma can be prescribed by the range 0.1 torr to 10 torr. The amount of $SiBr_4$ was 0.1 percent by volume of the nitrogen gas. It was found that this parameter could be varied from 0.01 percent to 1 percent to give satisfactory results. This general range of concentrations essentially applies to all gas reactants tested. The plasma was initiated with a Tesla coil between a water-cooled aluminum anode and the cathode at a voltage of 200 volts and current of 1 ampere. The cathode was a 5U4 electron tube filament drawing 10 amperes at 5 volts. The argon gas flow rate was adjusted until the plasma extended approximately between the two exhaust ports 21 and 22. The short mean free path of the gas molecules at these pressures and the opposing gas flow arrangement prevent the diffusion of the reactive gases into the anode and cathode compartments.

The silicon substrate was placed so as to be completely immersed in the plasma. An alnico magnet with a field of 2000 to 3000 gauss was mounted on the top of the reaction chamber to deflect the plasma to the region of the substrate. This is an optional expedient which is related to the geometry of the particular apparatus being used. Obviously if the plasma extends unnecessarily beyond the region of the substrate there is a waste of power and gas reactants.

Deposition was continued for 20 minutes after the plasma was struck. A silicon nitride film approximately one half a micron thick was obtained which had excellent surface quality and thickness uniformity. The substrate temperature during deposition was 350° C. It was found that good deposits can be obtained over the range of 300° C. to 800° C. Silicon nitride films formed at 300° C. to 400° C. were amorphous which is a desirable characteristic for many applications in semiconductor processing. For instance, amorphous silicon nitride etches more rapidly and uniformly than crystalline films. This property is important where the film is used as a diffusion mask. As the deposition temperature rises above 400° C. the film becomes increasingly crystalline. The substrate derives heat from the plasma during the deposition process. The amount of this heat is determined by the current density of the plasma. Under most conditions prescribed here it is necessary to supply supplemental heat to the substrate to insure the proper substrate temperature.

The low deposition temperature of this process is one of its outstanding features. The pyrolytic techniques of the prior art typically require substrate temperatures of the order of 1000° C. New applications are arising, such as the masking of devices on beam leads, which cannot tolerate such high temperatures and where the low-temperature deposition process of this invention is particularly important.

The foregoing example was repeated using oxygen in place of nitrogen. High quality films of silicon oxide were obtained. The wetting angle of a water drop with the insulating film was measured on these films. This test is important in determining behavior with respect to photoresist materials. A low contact angle, which implies a hydrophilic surface, results in undercutting of the photoresist film during etching operations. Silicon dioxide films prepared by this method show an initial contact angle of 5–10° if the plasma is extinguished while the reactants are still flowing into the oxidation chamber. If the reactants are cut off for two minutes or more before the plasma is extinguished the initial contact angle becomes 35–40°. The former type of observation probably results from incompletely reacted gases on the surface of the film, which undergo hydrolysis and give a hydrophilic surface and resultant low contact angle. Additional contact with the plasma after vapor cutoff gives more complete reaction and a high contact angle. Similar results were obtained with silicon nitride. There were no reported photoresist process difficulties if samples were exposed for a short time to nitrogen plasma after the flow of gas reactants was stopped.

Further samples were made in which silicon nitride films were deposited on silicon oxide films by using oxygen and nitrogen in the plasma sequentially. Surface charge densities of the order of $5\times10^{11}$ were obtained. This film property is important for the passivation of semiconductor devices.

Mixtures of oxygen and nitrogen can be used in the plasma to obtain a mixed oxide-nitride film. The etching rate of a mixed oxide-nitride film in aqueous hydrofluoric acid or in hot (180° C.) aqueous phosphoric acid is faster than that for a silicon nitride film. The faster etch rate property makes mixed oxide-nitride films superior to silicon nitride films for certain device applications.

The silicon-bearing material was varied among the halides and $SiH_4$ with no unusual change in the performance of the process $SiH_4$ was found to be useful in the same manner as the tetrabromide of Example I. Disilane ($Si_2H_6$) and trisilane ($Si_3H_8$) are chemically equivalent to $SiH_4$ and are equally useful. Other silicon halides behave in the same manner as silicon tetrabromide in this process. Among these, silicon tetrachloride, silicobromoform ($SiHBr_3$) and silicochloroform ($SiHCl_3$) are most available. A gas such as siloxane ($Si_6O_3H_6$) is obviously useful for forming oxide films and is also useful in forming predominantly silicon nitride films since the relative proportion of nitrogen to oxygen (using a nitrogen or ammonia carrier gas) is still very high. Silicylamine $(SiH_3)_3N$ is also useful for the purpose of the invention. The latter two compounds are also derivatives of silane.

For the purpose of defining the invention the silicon-bearing materials which are appropriate for use in the process described are silane and derivatives of silane. This includes silicon tetrahalide and silane as end members, siloxane which is a common name for (hexa-)hexaoxocyclosilane and silicylamine which is a common name for (tri-)nitrilosilane. All of these compounds function according to the description set forth herein.

Among the anion-bearing gases oxygen, nitrogen and ammonia are most significant. Another material of interest for which this process is useful is silicon carbide in which case methane or other simple hydrocarbon is used in the manner described to provide the anion. Silicon carbide has a very high melting point and is difficult to prepare by conventional techniques. It has some interesting and useful semiconductor properties.

Germanium compounds may be prepared in a manner analogous to the deposition of silicon compounds by using a germanium halide as a source material in combination with an appropriate anion source. Insulating films of germanium compounds are not generally used in the processing of semiconductor devices due to the inherent superiority of silicon compounds from almost every standpoint.

The procedure used in the example was also used to deposit films on other substrates such as gallium arsenide and quartz. Any material which is solid and stable under the processing conditions can be coated with an insulating film by this procedure.

What is claimed is:

1. A method for depositing a thin insulating film of a compound on a solid substrate body comprising the steps of mixing together at least two gaseous reactants one of which contains the anion of the said compound and another of which contains the cation of the said compound, introducing the mixture of gas reactants at a pressure in the range of 0.1 torr to 10 torr into a reaction chamber between two electrodes, flowing a protective gas around the surface of the said electrodes, the protective gas having a composition which is relatively inert to the electrode, the relative flow rates of the mixture of gas reactants and protective gas being adjusted so that two essentially static gas interfaces exist between the electrodes and the electrodes are continuously immersed in the protective gas to the exclusion of the gas reactants, establishing an electrical DC discharge between the two electrodes so that a plasma exists in the mixture of gaseous reactants, the plasma having boundaries coextensive with the said gas interfaces and characterized by a gas positive ion saturation current density in the range 0.1 to 100 ma./cm.$^2$, and immersing the substrate body in said plasma while maintaining the substrate at a temperature in the range 300° C. to 800° C. with the aid of plasma heating until a substantial insulating film of the said compound deposits on the substrate.

2. The method of claim 1 wherein one of the gaseous reactants is silane or a derivative thereof.

3. The method of claim 2 wherein two gaseous reactants are employed the other being selected from the group consisting of oxygen, nitrogen, ammonia, and methane.

4. The method of claim 3 wherein two films are deposited by using sequentially, oxygen and nitrogen.

5. The method of claim 1 wherein the substrate body is silicon.

6. The method of claim 1 wherein the protective gas is selected from the group consisting of helium, argon and nitrogen.

7. The method of claim 1 wherein the mixture of gaseous reactants is nitrogen containing 0.01 percent to one percent of $SiBr_4$.

References Cited

UNITED STATES PATENTS

| | | | |
|---|---|---|---|
| 3,077,108 | 2/1963 | Gage et al. | 73—147 |
| 3,332,870 | 7/1967 | Orbach et al. | 204—164 |

ROBERT K. MIHALEK, *Primary Examiner.*

U.S. Cl. X.R.

117—93.1.